(12) United States Patent
Metropoulos

(10) Patent No.: US 12,296,293 B2
(45) Date of Patent: May 13, 2025

(54) METHOD AND SYSTEM FOR AUTOMATED CLEANING OF FILTER WALL FOR HVAC SYSTEMS

(71) Applicant: BLUE BOX AIR, LLC, Dallas, TX (US)

(72) Inventor: James Metropoulos, Dallas, TX (US)

(73) Assignee: BLUE BOX AIR, LLC, Dallas, TX (US)

( * ) Notice: Subject to any disclaimer, the term of this patent is extended or adjusted under 35 U.S.C. 154(b) by 0 days.

(21) Appl. No.: 18/373,176

(22) Filed: Sep. 26, 2023

(65) Prior Publication Data

US 2024/0100461 A1    Mar. 28, 2024

Related U.S. Application Data

(60) Provisional application No. 63/410,436, filed on Sep. 27, 2022.

(51) Int. Cl.
    *B01D 46/46*     (2006.01)
    *B01D 46/42*     (2006.01)
    (Continued)

(52) U.S. Cl.
    CPC .......... *B01D 46/46* (2013.01); *B01D 46/4263* (2013.01); *B01D 46/444* (2013.01);
    (Continued)

(58) Field of Classification Search
    CPC ..................................................... B01D 46/46
    See application file for complete search history.

(56) References Cited

U.S. PATENT DOCUMENTS

| 3,037,887 A | 6/1962 | Brenner et al. |
| 3,244,223 A | 4/1966 | Edwards |

(Continued)

FOREIGN PATENT DOCUMENTS

| CN | 102615070 A | 8/2012 |
| CN | 202547489 U | 11/2012 |

(Continued)

OTHER PUBLICATIONS

International Search Report and Written Opinion received for PCT Patent Application No. PCT/US23/062729, mailed on Jun. 8, 2023, 11 pages.

(Continued)

*Primary Examiner* — Jason Y Ko
(74) *Attorney, Agent, or Firm* — Workman Nydegger

(57) ABSTRACT

Devices, systems, and methods for the automated cleaning of filters and filter walls within heating, ventilation, and air-conditioning (HVAC) systems. Disclosed devices can include self-cleaning filter assemblies configured to receive and surround at least one filter, such as an HVAC filter. In some embodiments, the self-cleaning assemblies receive and surround at least one filter and at least one fan. For example, at least one filter or filter wall comprising multiple filters and fan may be combined together into a single cube, where the cube is then received and surrounded by the self-cleaning casing. In some embodiments, the self-cleaning assemblies or cubes receive and surround at least one filter, at least one fan, and at least one heat transfer coil. The cleaning system can have different cleaning cycles, such as a cleaning cycle that cleans the filter(s) and a different cleaning cycle that cleans the heat transfer coil.

20 Claims, 5 Drawing Sheets

Figure 1B:
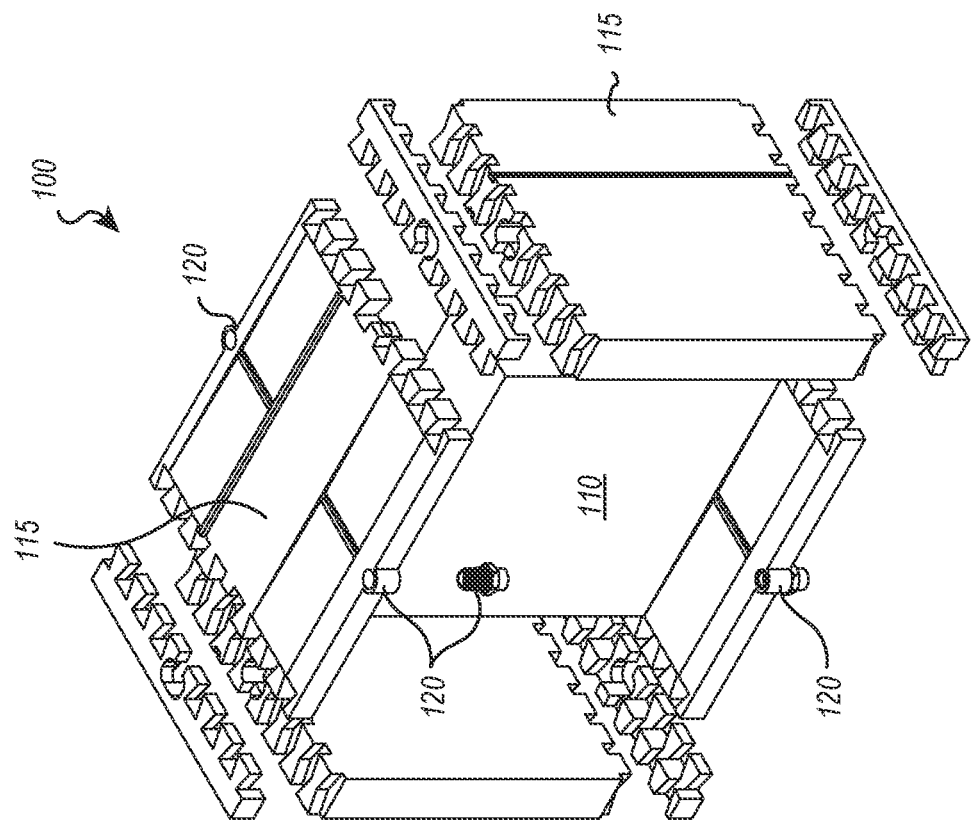

(51) Int. Cl.
  *B01D 46/44*    (2006.01)
  *B01D 46/69*    (2022.01)
  *B01D 46/79*    (2022.01)
  *F24F 11/39*    (2018.01)
  *F24F 13/22*    (2006.01)
  *F24F 110/40*   (2018.01)

(52) U.S. Cl.
  CPC ........... *B01D 46/446* (2013.01); *B01D 46/69* (2022.01); *B01D 46/79* (2022.01); *F24F 11/39* (2018.01); *F24F 13/222* (2013.01); *B01D 2273/30* (2013.01); *B01D 2279/50* (2013.01); *F24F 2110/40* (2018.01); *F24F 2221/225* (2013.01)

(56) References Cited

U.S. PATENT DOCUMENTS

| | | |
|---|---|---|
| 3,739,556 A | 6/1973 | Waters |
| 4,332,292 A | 6/1982 | Garberick |
| 4,676,305 A | 6/1987 | Doty |
| 5,509,972 A | 4/1996 | Akazawa et al. |
| 5,529,972 A | 6/1996 | Ramello et al. |
| 5,737,937 A | 4/1998 | Akazawa |
| 5,911,742 A | 6/1999 | Akazawa |
| 5,924,478 A | 7/1999 | Crocker |
| 6,027,572 A | 2/2000 | Labib et al. |
| 6,047,714 A | 4/2000 | Akazawa |
| 6,109,359 A | 8/2000 | Ballard |
| 6,276,459 B1 | 8/2001 | Herrick et al. |
| 7,132,017 B2 | 11/2006 | Laurence |
| 7,841,351 B1 | 11/2010 | Kane et al. |
| 7,887,639 B1 | 2/2011 | Ratliff et al. |
| 9,676,007 B1 | 6/2017 | Kane et al. |
| 10,480,875 B2 | 11/2019 | Metropoulos |
| 2003/0024552 A1 | 2/2003 | Watanabe |
| 2006/0037736 A1 | 2/2006 | Heyman |
| 2007/0125520 A1 | 6/2007 | Nutsos |
| 2008/0041025 A1 | 2/2008 | Boyer et al. |
| 2008/0078532 A1 | 4/2008 | Nagashima et al. |
| 2008/0193650 A1 | 8/2008 | Lyon |
| 2010/0078007 A1 | 4/2010 | Post |
| 2010/0326470 A1 | 12/2010 | Seippel |
| 2011/0056668 A1 | 3/2011 | Taras et al. |
| 2014/0238643 A1 | 8/2014 | Hains et al. |
| 2014/0284027 A1 | 9/2014 | Pozzie et al. |
| 2015/0144303 A1 | 5/2015 | Burfeind |
| 2015/0211819 A1 | 7/2015 | Lindstrm et al. |
| 2016/0044909 A1 | 2/2016 | Lampe |
| 2016/0054070 A1 | 2/2016 | Calton |
| 2016/0279562 A1 | 9/2016 | Williams et al. |
| 2017/0059119 A1 | 3/2017 | Bennett et al. |
| 2017/0191768 A1 | 7/2017 | Metropoulous |
| 2017/0292802 A1 | 10/2017 | Billings |
| 2019/0257592 A1 | 8/2019 | Fiello et al. |
| 2020/0041220 A1 | 2/2020 | Metropoulos |
| 2020/0080799 A1 | 3/2020 | Johns et al. |
| 2020/0208928 A1 | 7/2020 | Korth et al. |
| 2020/0284534 A1 | 9/2020 | Pess et al. |
| 2021/0170455 A1 | 6/2021 | Kleinvachter et al. |
| 2021/0291206 A1 | 9/2021 | Al-Otaibi |
| 2023/0280116 A1 | 9/2023 | Metropoulos |

FOREIGN PATENT DOCUMENTS

| | | |
|---|---|---|
| CN | 202864069 U | 4/2013 |
| CN | 103245252 A | 8/2013 |
| CN | 104215120 A | 12/2014 |
| CN | 104896711 A | 9/2015 |
| CN | 108369081 A | 8/2018 |
| EP | 3748245 A1 | 12/2020 |
| JP | 07-332891 A | 12/1995 |
| JP | 09-061092 A | 3/1997 |
| JP | 09-178394 A | 7/1997 |
| JP | 10-205791 A | 8/1998 |
| JP | 11-132593 A | 5/1999 |
| JP | 11-132693 A | 5/1999 |
| JP | 2000-226600 A | 8/2000 |
| JP | 2000-273001 A | 10/2000 |
| JP | 2007-178096 A | 7/2007 |
| JP | 2009-030932 A | 2/2009 |
| JP | 2013-094759 A | 5/2013 |
| WO | 02/94973 A1 | 11/2002 |
| WO | 2017/054515 A1 | 4/2017 |

OTHER PUBLICATIONS

International Search Report and Written Opinion received for PCT Patent Application No. PCT/US2023/063744, mailed on Aug. 11, 2023, 13 pages.

International Search Report cited in PCT Application No. PCT/US2016/054515 dated Dec. 2, 2016.

Outgoing—ISA/210—International Search Report Mailed on Jun. 8, 2023 for WO Application No. PCT/US23/062729, 3 page(s).

International Preliminary Report on Patentability received for PCT Patent Application No. PCT/US2023/063744, mailed on Sep. 19, 2024, 10 pages.

International Search Report and Written Opinion received for PCT Patent Application No. PCT/US23/075198, mailed on Feb. 28, 2024, 12 pages.

International Search Report and Written Opinion received for PCT Patent Application No. PCT/US23/72857, mailed on Feb. 15, 2024, 14 pages.

Invitation to Pay Additional Fees received for PCT Patent Application No. PCT/US23/72857, mailed on Nov. 13, 2023, 2 pages.

METHOD AND SYSTEM FOR AUTOMATED CLEANING OF FILTER WALL FOR HVAC SYSTEMS

CROSS-REFERENCE TO RELATED APPLICATION

Technical Field

This Application claims the benefit of U.S. Provisional Application No. 63/410,436, filed Sep. 27, 2022, which is incorporated herein by reference in its entirety.

BACKGROUND

Technical Field

This disclosure generally relates to self-cleaning heating, ventilation, and air-conditioning (HVAC) filters and the automated cleaning of filter walls for HVAC systems.

Related Technology

The role of air filters in HVAC systems is to filter out unwanted particulates from the air stream circulating throughout an HVAC system and, thus, a building. Various different types of particulates may be present, such as dirt, inorganic dust particles, microbes, allergens, hydrocarbons, as well as a host of other particles that may find their way into a building's air stream. Filtering out these particles is necessary to maintain, and even improve, the indoor air quality of a building (commercial or otherwise). Filtering out these particles also prevents severe and early fouling of an HVAC system's heat transfer coils. As the heat transfer coils within an HVAC system get dirty and fouled, their heat transfer efficiency drops considerably. Preventing this fouling ensures efficient operation of the HVAC's heat transfer coils because they stay cleaner for longer periods of time.

Currently, filters are manually installed into HVAC systems, where the system can range from very large air handlers, such as those installed in commercial buildings, to small individual fan coils, such as those installed in smaller and/or residential buildings. Wherever the filters are installed, they typically must be replaced within a 2- to 12-month time frame. Within this time frame, the filters often quickly load or clog up with particulates, which greatly alters and increases the air flow resistance flowing through the filter and the filter media (i.e., what the filter is made out of).

This increase in air flow resistance (otherwise known as delta P), quickly leads to several challenging operational issues in the HVAC system. For example, as air flow is restricted due to particle loading within the filter, the load on the blower that is moving air through the filters and the overall HVAC system is correspondingly increased. This increase in load directly increases the overall energy consumption of the blower and the blower's motor. This leads to increased operational costs as well as an increase in the overall carbon footprint for a building, just from the operation of the HVAC system.

In addition to increasing energy consumption and energy costs, a restriction in air flow due to filer loading also directly affects the overall ventilation of a building or facility. This occurs when the total volume of air flow is diminished so that fewer fresh air molecules (i.e., air molecules that originated external of the building) are circulating through the building. For example, most buildings or facilities are supposed to bring in approximately 10% outside air, while recirculating approximately 90% of the building's internal air.

However, when filters clog up with particulates and their delta P climbs (e.g., up to 5- or even 10-times the original delta P the filters were designed for), the resulting air flow restriction quickly reduces the volume of fresh air that is, and is capable of, moving through the HVAC system. This decrease in the volume of circulating fresh air directly leads to a buildup of $CO_2$ within a building. The rise in $CO_2$ is often directly connected to the respiration of people within the building, all of whom exhale $CO_2$ as they breathe. Studies have shown that buildups of $CO_2$ within indoor spaces can reduce workplace productivity by as much as 30%. A rise in other volatile organic compounds (VOCs) or other biological fouling within an indoor space can also occur due to a restriction of fresh air moving through the HVAC system. This is because the VOCs or other biological fouling are unable to be cycled out of the indoor environment, leading to a reduction in the indoor air quality.

Another common problem often encountered in HVAC filtration is the creation of bypass flows because of the increased delta P across the filter. A bypass flow occurs when the air flow (and particulates contained therein) bypass filters in place in the HVAC system. Bypass flows are particularly problematic in larger HVAC systems (such as air handlers) which are often outfitted with many filters. For example, filters are often positioned within a filter rack contained in the large air handler, whereby multiple filters are slid into position within the rack.

During installation, a technician attempts to ensure there are no spaces between the filters, but there will always be a presence of small micro gaps between each filter in the rack. When filters are brand new and the filter media is clean with relatively low air flow restriction, bypass is relatively small. An air stream can easily flow through the filters without restriction and the air stream is, thus, adequately filtered. As a filter begins to clog up with particulates and the delta P across the filter increases, the air flow is quickly restricted and bypass of air around and between the filters increases. This results in a higher volume of the air stream that is not filtered before it is circulated throughout a building. An estimated 15% of the air flow in an air handler can bypass the filters due to this effect. Because approximately 15% of the air flow in the air handler bypasses the filters, the heat transfer coils downstream of the filters can become fouled prematurely.

The primary reason why filters are allowed to build up with such high loads of particulates is that they are expensive to buy, replace and dispose of Due to the economics behind filter replacements, most buildings or facilities leave their filters in place until the costs associated with filter loading (e.g., increased energy and operational costs) outweigh the costs associated with changing and replacing the filters.

Not only do clogged filters increase the energy consumption and carbon footprint of a building, the disposable nature of filters themselves lead to massive supply chain carbon footprints. Filters and their frames are often made from synthetic fibers, such as polypropylene or polyethylene, which are not readily biodegradable. Thus, when filters are disposed of, they are often sent directly to landfills. Filters are also often relatively large and bulky, with extensive shipping requirements for transport and delivery to buildings or facilities. This increases the fuel and time required to transport and deliver the filters.

Generally, air filters within HVAC systems can represent the single most wasteful part of the HVAC system. The air filters additionally result in high operating costs and in a massive carbon footprint. There is clearly a long felt and unmet need for improving the efficiency of air filtration in HVAC systems.

SUMMARY

Disclosed are devices, systems, and methods for the automated cleaning of filters and filter walls within heating, ventilation, and air-conditioning (HVAC) systems. Disclosed devices can include self-cleaning filter assemblies configured to receive and surround at least one filter, such as an HVAC filter. In some embodiments, the self-cleaning assemblies receive and surround at least one filter and at least one fan. For example, at least one filter and fan may be combined together into a single cube, where the cube is then received and surrounded by the self-cleaning casing. In some embodiments, the self-cleaning assemblies receive and surround at least one filter, at least one fan, and at least one heat transfer coil. In some embodiments, multiple self-cleaning filter assemblies or modules can be joined together to form a single filter wall. The cleaning system can have different cleaning cycles, such as a cleaning cycle that cleans the filter(s) and a different cleaning cycle that cleans the heat transfer coil.

The self-cleaning filter assemblies include at least two (2) injection ports disposed and center positioned along a top edge and a bottom edge of the front and back of the self-cleaning assembly. The self-cleaning assemblies can also include a plurality of injection ports disposed and positioned along opposing side edges or surfaces of the casing. In some embodiments, injection ports can additionally be included along a surface of the casing. Drainage ports may be included, such as on the bottom edge or surface of the casing surrounding the filter(s). It is also possible for waste water from the filter cleaning cycle can flow out and down the front and/or rear sides of the filter(s) toward a drain or collection basin below the filter(s).

Disclosed systems can include at least one filter assembly in communication with a central system. The at least one filter assembly includes at least one self-cleaning casing having received and surrounded at least one filter. The at least one filter assembly can further include at least one fan and/or at least one heat transfer coil. The central system can include, at least, one or more liquid pumps, one or more air compressors, one or more reservoir tanks, and one or more programmable logic controllers. The filter assembly can include standard sized filter panels, such as 6 inch×6 inch or 12 inch×12 inch filter panels.

Also disclosed are methods of automatically cleaning filters and/or filter walls of an HVAC system. The methods can include, for example, providing one or more self-cleaning filter assemblies or modules and running an automated cleaning process. The automated cleaning process may be governed and/or controlled by a programmable logic controller (PLC) that is part of a central system and is in communication with the self-cleaning filter assembly. Running the automated cleaning process may include: (i) providing a water line as a source of water for making a cleaning solution; (ii) optionally collecting condensate water from the evaporative coil(s) of an HVAC system as an auxiliary or alternate source of water for making the cleaning solution; (iii) mixing water with one or more reagents to form the cleaning solution; (iv) delivering the cleaning solution to a plurality of injection ports disposed within the self-cleaning filter assembly; and (v) flushing the cleaning solution through the self-cleaning filter assembly, thereby cleaning the filter of the HVAC system. The wastewater from cleaning the filters or filter wall can be disposed of through a drain or it can be cleaned (e.g., filtered) and reused. The cleaning system can have different cleaning cycles, such as a cleaning cycle that cleans the filter(s) and a different cleaning cycle that cleans the heat transfer coil(s).

In some embodiments, condensed water from the cooling coils of an HVAC system can be recovered and utilized to clean the filters, such as by using the condensed water to make the cleaning solution. This can reduce installation costs by eliminating installation of water lines. The recovered condensate can be used when there is not a ready supply of available water and/or to augment or supplement water already available to reduce cost and save water. The condensate is distilled water and therefore potentially cleaner than municipal water (e.g., will typically be mineral free and possibly more sterile if the coils are clean).

In some embodiments, the self-cleaning filter assemblies can be configured with one or more nozzles or other means configured to periodically emit aerosolized enzymes into the air stream on the downstream side of the filter wall. The aerosolized enzymes can be drawn into the heat transfer coils, and this automated process of regularly injecting enzymes into the coils can inhibit microbial fouling of the coils, ensuring that both the filter wall and heat transfer coils are operating at their design delta P's (pressure differential) for peak efficiency.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

FIGS. 1A-1B schematically illustrate an example of a self-cleaning assembly according to the disclosure;

FIG. 2 schematically illustrates another example of a self-cleaning assembly with multiple filter modules forming a filter wall;

FIG. 3 schematically illustrates an example of a filter wall constructed from a plurality of self-cleaning assemblies; and FIGS. 4 and 5 are flowcharts that illustrate example methods according to the disclosure.

DETAILED DESCRIPTION

Disclosed are devices, systems, and methods for automated cleaning of filters and filter walls within HVAC systems. Disclosed devices can include self-cleaning assemblies configured to receive and surround at least one filter, which may be an HVAC filter. The self-cleaning filter assemblies include, at least, one or more self-cleaning casings. In some embodiments, the one or more self-cleaning casings each receive and surround at least one filter and at least one fan. For example, at least one filter and fan may be combined together into a single assembly (e.g., cube), which is then received and surrounded by the self-cleaning casing. The fan is included to cause air to flow through the casing and the self-cleaning filter assembly. In some embodiments, the self-cleaning casings receive and surround at least one filter, at least one fan, and at least one heat transfer coil. The cleaning system can have different cleaning cycles, such as a cleaning cycle that cleans the filter(s) and a different cleaning cycle that cleans the heat transfer coil.

The filters and filter walls can be used with existing and/or standard HVAC systems. In some embodiments, the filters and filter walls can be used with the new "cube" HVAC systems disclosed in U.S. application Ser. No. 18/455,433, filed Aug. 24, 2023, and entitled "Closed Loop, Modular And Self-Cleaning HVAC system," which is incorporated herein by reference in its entirety.

In some embodiments, the self-cleaning casings are sized and shaped to receive and surround an HVAC filter. Specifically, the self-cleaning casings can be substantially cuboid or rectangular cuboids, meaning the casings have a top, bottom and sides. The self-cleaning casings include at least two (2) injection ports disposed and positioned along the top edge or surface of the self-cleaning casing. The self-cleaning casings can also include a plurality of injection ports disposed and positioned along opposing side edges or surfaces of the self-cleaning casing. Drainage ports may be included, such as on the bottom edge or surface of the casing surrounding the filter(s). It is also possible for waste water from the filter cleaning cycle can flow out and down the front and/or rear sides of the filter(s) toward a drain or collection basin below the filter(s).

Disclosed systems can include at least one filter assembly in communication with a central system. The at least one filter assembly includes at least one self-cleaning casing that receives and surrounds at least one filter. In some embodiments, multiple self-cleaning filter assemblies or modules can be joined together to form a single filter wall. The at least one filter assembly can further include at least one fan and/or at least one heat transfer coil. The central system can include, at least, one or more liquid pumps, one or more air compressors, one or more reservoir tanks, and one or more programmable logic control boards.

Also disclosed are methods of automatically cleaning filters and/or filter walls of an HVAC system. The methods can include, for example, providing a self-cleaning filter assembly and running an automated cleaning process. The automated cleaning process may be governed and/or controlled by a programmable logic controller (PLC) that is part of a central system and in communication with the self-cleaning filter assembly. Running the automated cleaning process may include: (i) providing a water line as a source of water for making a cleaning solution; (ii) optionally collecting condensate water from the evaporative coil(s) of an HVAC system as an auxiliary or alternate source of water for making the cleaning solution; (iii) mixing water with one or more reagents to form the cleaning solution; (iv) delivering the cleaning solution to a plurality of injection ports disposed within the self-cleaning filter assembly; and (v) flushing the cleaning solution through the self-cleaning filter assembly, thereby cleaning the filter of the HVAC system. The wastewater from cleaning the filters or filter wall can be disposed of through a drain or it can be cleaned (e.g., filtered) and reused. The cleaning system can have different cleaning cycles, such as a cleaning cycle that cleans the filter(s) and a different cleaning cycle that cleans the heat transfer coil(s).

In some embodiments, condensed water from the cooling coils of an HVAC system can be recovered and utilized to clean the filters, such as by using the condensed water to make the cleaning solution. This can reduce installation costs by eliminating installation of water lines. The recovered condensate can be used when there is not a ready supply of available water and/or to augment or supplement water already available to reduce cost and save water. The condensate is distilled water and therefore potentially cleaner than municipal water (e.g., will typically be mineral free and possibly more sterile if the coils are clean).

In some embodiments, the self-cleaning filter assemblies can be configured with one or more nozzles or other means configured to periodically emit aerosolized enzymes into the air stream on the downstream side of the filter wall. The aerosolized enzymes can be drawn into the heat transfer coils, and this automated process of regularly injecting enzymes into the coils can inhibit microbial fouling of the coils, ensuring that both the filter wall and heat transfer coils are operating at their design delta P's (pressure differential) for peak efficiency.

Figure 1A:
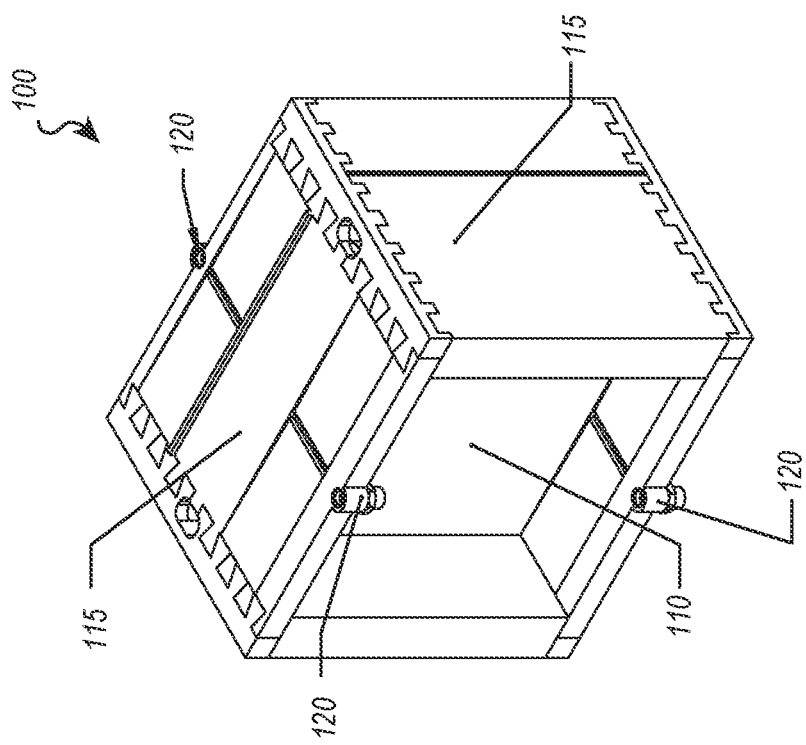
Figure 2:
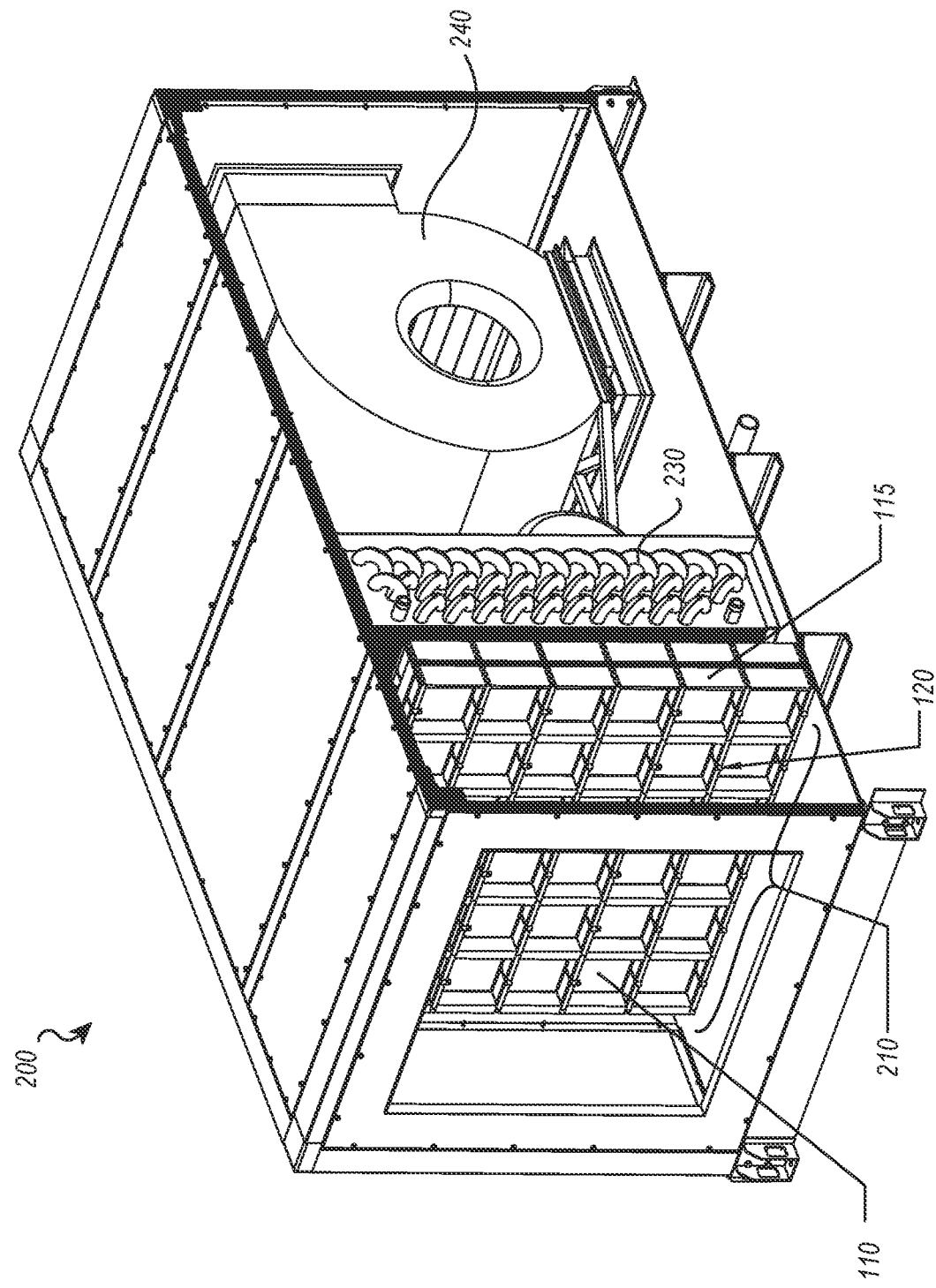
Figure 3:
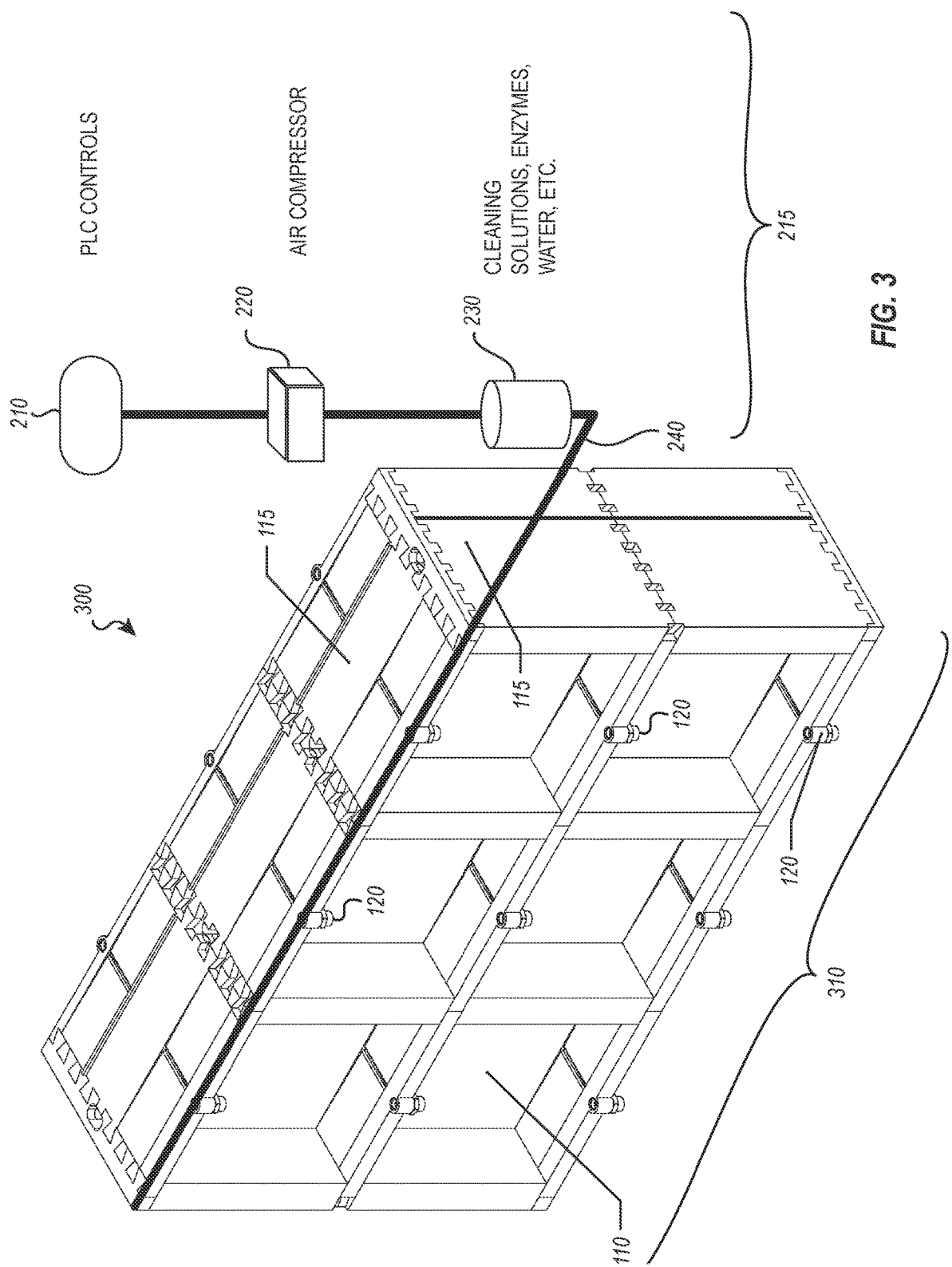

FIGS. 1A-1B, 2 and 3 illustrate examples of a self-cleaning filter assembly according to the present disclosure. FIG. 1A illustrates a self-cleaning filter assembly 100. FIG. 1B is an exploded view of the self-cleaning filter assembly 100 of FIG. 1A. FIG. 2 illustrates an HVAC system (e.g., "cube") 200 that incorporates multiple self-cleaning filter assemblies 100 and filters 110 forming a filter wall 210. FIG. 3 illustrates a filter wall 310 formed from multiple self-cleaning filter assemblies 100 and filters 110 and casings 115.

As illustrated in FIGS. 1A and 1B, the self-cleaning assembly 100 includes a filter 110, a casing 115 surrounding the filter 11—, and injection ports 120. As illustrated, the self-cleaning assembly 100 includes two (2) injection ports 120, a first injection port 120 centered along a top edge or surface of the casing 115 and a second injection port 120 centered along a bottom edge or surface of the casing 115. In some embodiments, the self-cleaning assembly 100 can include more than two injection ports 120, such as 3, 4, 5, 6, 7 or 8, in or on the casing 115 surrounding the filter 110, such as on the top, bottom, and/or sides of the casing 115.

The filter 110 is housed within the casing 115. Typically, the filter 110 will be positioned or installed within the casing 115 so that filter 110 will rest just behind the injection ports 120. The primary purpose of the injection ports 120 is to inject or spray a viscous cleaning foam or non-viscous cleaning solution directly toward the face of the filter 110 (e.g., the air intake side so that the cleaning foam or solution is drawn into and through the filter 110 by air flow, such as by the air handler of the HVAC system). Positioning the filter 110 "behind" the plurality of injection ports 120 allows the cleaning foam or solution to flow out of the ports 120 and directly onto the front face of the filter 110. The cleaning foam or solution can then flow or fall down the front face of the filter 110, thereby substantially covering the entire front face of the filter 110. When the cleaning solution is subsequently pulled through the filter 110, the filter 110 will be completely cleaned and de-clogged. The dirty water can exit the back face of the filter 110 and flow down toward a drain or collection basin (not shown).

The cleaning foam or solution can include any combination of air, water, enzymes, chemicals, and surfactants in order to achieve desired cleaning attributes. Examples of foams or other cleaning solutions that may be utilized with the disclosed devices, systems, and methods are described in U.S. Pat. Pub. No. 2023/0280116 and U.S. Pat. Pub. No. 2023/0258421, which are incorporated herein by reference in their entirety.

In addition, other cleaning agents such as enzymes and other chemicals can be introduced to the cleaning solution formula depending on the operating environment. The utilized cleaning solution can be customized for the particular needs of any given building or facility. For example, in industrial applications such as paint booth operations, it may be advantageous to inject a paint thinning formulation into the cleaning solution to assist in breaking down any fine particles captured from this air stream. In other applications, introduction of varying degreasers may assist in removing hydrocarbon-based particles.

Injecting a thick cleaning foam or solution onto the face of the filter 110 removes any particulates that have been captured in the filter media (i.e., the fibers of the filter), and migrates these particles out of the filter media. This is accomplished by first injecting the thick cleaning foam or solution into the front face of the filter 110 while air is flowing through the filter casing 115. The air flow will pull the thick cleaning foam or solution through the filter 110 and the interior of the casing 115. As the cleaning foam or solution migrates through the filter 110 and casing 115, any organic and/or inorganic particles will be encapsulated into the thick cleaning foam or solution, gently removing these particles from the fibers of the filter 110. Migrating the cleaning foam or solution through the casing 115 in this way maintains the integrity of the fibers of the filter 110.

In some embodiments, the filters 110 are constructed with a synthetic polymer filter media, such as fibers of polypropylene, polyethylene, a similar synthetic fiber, and/or combinations thereof. These materials are capable of being wetted without degradation of the filter fibers. As the cleaning foam or solution migrates through the synthetic filter media and removes the captured particulates from within the filter media, the cleaning foam or solution and the encapsulated particulates will then collect into a drain or collection basin (not shown) incorporated into the bottom of the casing 115. The fouling particulates can then simply be flushed down the drain, leaving the filter 110 particulate free. The filter 110 is then ready to filter and clean the air stream flowing through the HVAC system.

In some embodiments, the cleaning foam or solution can be a thick, shaving cream-like foam. In some embodiments, the cleaning foam or solution can be formulated to deposit a negative charge on the filter media as it moves through the filter 110 and removes inorganic and/or organic particles from the filter media. This introduction of an ionic static charge can further enhance the filtration effect of the filter media by attracting new incoming particles as they pass through the filter 110.

In addition to a thick cleaning foam or solution, less viscous cleaning solutions can also be used to flush and clean the filters 110 contained within the casing 115. For example, the injection ports 120 can deliver aqueous-based cleaning solutions or plain water. In some embodiments, a thick cleaning foam or solution is first flushed through the casings 115 to collect and migrate out particulates contained within the filter 110. An aqueous-based solution or plain water can then be flushed through the casings 115. Running water through the casing 115 after the thick cleaning foam or solution helps remove any remaining particulates and/or cleaning foam or solution from the filter 110.

Placing a plurality of injection ports 120 along the top and bottom edges (and optionally along the sides) of the casing 115 allows cleaning solution to flow around and through substantially all portions of the filter 110. Gravity will assist in pulling the injected cleaning solution down the face of the filter 110. Providing more injection ports 120 at various points of the casing 115 means a higher volume of cleaning solution can be applied, resulting in no gaps or spaces on the face of the filter 110 without applied cleaning solution. A higher volume of injected cleaning solution ensures the filter 110 is fully and properly cleaned, removing all particulates present and captured in the filter media.

In some embodiments, one or more sensors (not shown) can be mounted within the casing 115. The one or more sensors may be mounted or embedded on or around a perimeter of the casing 115 that interfaces with the filter 110. For example, temperature, volume, and/or pressure sensors can be mounted on or within the casing 115. Pressure sensors can be configured to monitor and measure the delta P (or air pressure differential) across the filter 110. When the delta P across the filter satisfies a threshold level (i.e., equals or exceeds a threshold pressure drop across the filter), the pressure sensor can communicate this change to a central system (discussed more below), indicating that the filter 110 needs to be cleaned. The central system can then automatically execute a cleaning process.

In some embodiments, the threshold delta P can be a change of approximately 1-5% in air pressure flowing across the filter compared to the air pressure or delta P the filter was designed to withstand. In some embodiments, the filters 110 are initially configured for a delta P range of 0.04 inches of water guage (In-Wg) to 1.5 In-Wg (or approximately 0.05 pounds-per-square-inch), such as 0.05 In-Wg, 0.1 In-Wg, 0.3 In-Wg, 0.5 In-Wg, 1.0 In-Wg, or a range defined by any two of the foregoing values. As the filters 110 become clogged with particulates, the delta P range can climb to approximately 2-4 In-Wg, such as 2.5 In-Wg, 3 In-Wg, 3.5 In-Wg, or a range defined by any two of the foregoing values.

FIG. 2 illustrates an HVAC "cube" 200 that includes multiple self-cleaning assemblies 100, filters 110, and casings 115, which are joined to form a filter wall 210, and that also includes heat transfer coils 230 and a fan 240. Examples of HVAC "cubes" that include a filter wall, heat transfer coils, and fan are described in U.S. patent application Ser. No. 18/455,433, filed Aug. 24, 2023, entitled "Closed Loop, Modular and Self-Cleaning HVAC System," the entire contents of which are herein incorporated by reference. The heat transfer coils 230 are configured to transfer thermal energy to and/or from air circulating and passing through the self-cleaning assembly 200. The fan 240 draws air through the filters 110 of the filter wall 210, which helps draw the cleaning solution through the filters 110 and filter wall 210. FIG. 3, discussed more fully below, more particularly illustrates how multiple self-cleaning assemblies 100, filters 110 and casings 115 can be joined together into an automated self-cleaning system 300 with a single filter wall 310.

In some embodiments, the casing 115 is sized and shaped to house a filter 110. For example, the casing 115 may have a 12"×12" (e.g., 12 inches by 12 inches) opening to receive a 12"×12" filter 110. Alternatively, the casing 115 can have a 6"×6" opening, an 8"×8" opening, a 10"×10" opening, a 14"×14" opening, a 16"×16" opening, an 18"×18" opening, a 22"×22" opening, a 24"×24" opening, or an opening defined by any two of the foregoing values, in order to house a correspondingly-sized filter 110. The size of the opening for the casing 115 is influenced by how the cleaning and drainage systems of a building or facility are configured. The casing 115 can have a depth ranging from 3" (inches) to 36" (inches), such as 4", 5", 6", 8", 10", 12", 20", 24", 32", or a range defined by any two of the foregoing values. The casing 115 can also be sized and shaped to form a tight fit with the filter 110. The tight fit eliminates any air gaps between the casing 115 and the filter 110, reducing or eliminating bypass flows that otherwise might be present.

These various shape and sizing configurations allow self-cleaning assemblies and systems (discussed below) to be incorporated into any existing HVAC system. For example, if a large air handler needs to be retrofitted so that only a self-cleaning filter wall is installed (see FIGS. 2 and 3), existing filter racks would be removed, and then modular self-cleaning assemblies would be installed in its place. The modular self-cleaning assemblies would be tightly packed with a face plate covering the entire inner diameter volume of the air handler, as well as covering gaps between each self-cleaning casing. The face plate would then ensure all air flow will flow through the opening ports of the filters. In some embodiments, the face plate will fit the outer diameter or dimensions of the filter wall where there may be an air gap between the outer dimensions of the filter wall and the inner dimensions of the air handler. In some embodiments, the face plate is a custom fitted plate to ensure no air bypasses the filter wall.

FIG. 3 illustrates an automated self-cleaning system 300, which includes an arrangement of a plurality of self-cleaning assemblies, filters 110, and casings 115 connected to a central system 215. The self-cleaning assemblies can be the self-cleaning assemblies 100 illustrated in FIGS. 1A and 1B. The plurality of self-cleaning assemblies 100 are arranged as a single "filter wall" 310. In such an arrangement, each self-cleaning filter assembly is positioned adjacent to another self-cleaning filter assembly, reducing or eliminating air gaps between adjacent self-cleaning filter assemblies. In this way, the system 300 can eliminate bypass flows around clogged filters. The central system 215 includes, at least, a programmable logic controller (PLC) 210, an air compressor 220, and a reservoir tank 230 for cleaning solutions, enzymes, water, etc. More than one PLC 210, air compressor 220, and reservoir tank 230 may be included in the system 300, as appropriate.

The PLC 210 can include a plurality of sensors and microprocessor units configured to track and control an automated cleaning process. For example, the PLC 210 can include temperature sensors, timers, volume sensors, pressure sensors, and other sensors that are configured to assist in running an automated cleaning process. Examples of PLC and other circuit boards that can be utilized with the disclosed devices, systems, and methods are outlined in U.S. Pat. Pub. No. 2023/028116, already incorporated herein by reference. The PLC 210 can also control a mixture or formula of the cleaning solution, thereby controlling which solution gets delivered to the self-cleaning filter assemblies. For example, including paint thinner (e.g., mineral spirits) in the cleaning solution may be desirable. In this case, the PLC 210 would control the ultimate formula of the cleaning solution, including the paint thinner, that gets mixed and delivered to the self-cleaning filter assemblies. In cases where paint thinner is not desired, the PLC 210 would adjust the formula of the cleaning solution accordingly. Thus, the PLC 210 exhibits a degree of control over customization of the cleaning solution ultimately flushed through the self-cleaning filter assemblies.

The plurality of sensors and microprocessor units of the PLC 210 can be in communication with the sensors mounted and disposed within the casing of the self-cleaning assemblies of FIGS. 1A, 1B, 2 and 3. For example, pressure sensors within the casing can measure/detect when the delta P (or air pressure differential) across the filter has satisfied a threshold value, triggering the PLC 210 to start an automatic cleaning process. For example, when pressure sensors within the casing have detected a change in delta P across the filter of approximately 1-5% of the designed delta P specification for the filter, the sensors may trigger operation of an automatic cleaning process. Additionally, and/or alternatively, the PLC 210 can automatically run a cleaning process within a pre-determined time period, such as daily, weekly, monthly, quarterly, etc. The frequency of the automatic cleaning processes will depend on the type of building or facility the system 200 or system 300 is installed in. The frequency of the automatic cleaning processes will also depend on the type of fibers the filter is constructed from. The PLC 210 can also be programmed to run different cleaning cycles for the filter(s) and heat transfer coils so that dirty water from cleaning the filters does not inadvertent enter and potentially clog and foul the heat transfer coils.

As also shown in FIG. 3, the injection ports of each self-cleaning assembly 100 are connected to the central system 215 via one or more tubes 240. The tubes 240 deliver cleaning solution from the reservoir tank(s) 230 to the injection ports of each self-cleaning assembly 100. Like the self-cleaning assembly 100 in FIGS. 1A and 1B, the filters 110 in the plurality of self-cleaning assemblies 100 can be located just behind the injection ports 120. Thus, when cleaning solution is delivered to each of the self-cleaning assemblies 100, the cleaning solution will flow down and through the face of the filters. If the fan 240 is running (see FIG. 2), the cleaning solution can flow through the filters 110 and exit the rear face of the filters 110.

In some embodiments, the self-cleaning assemblies 100 include a heat transfer coil and fan housed within each of the casings (not shown). Arrangement of the self-cleaning assemblies 100 forms a mono-coil wall along with a fan array wall, where the fan array wall is positioned in front of both the filter wall and the mono-coil wall. The fan array wall is often comprised of segmented fans that can individually turn on or off to regulate the total air flow of the system. Additionally, and/or alternatively, the self-cleaning filter wall can be installed with each casing outfitted with a dedicated fan, that can also be 6"×6" to 12"×12" in size, whereby the filter and the fan are combined into a single cube. During normal operation of the HVAC system, air flow is pulled through the filter and then through the coil wall. In yet another example, the filter, coil, and fan are all contained within one casing, whereby the air flows through the air handler and then through these modular assemblies, all of which are connected together into on singular filter, coil, fan array wall within the air handler.

Figure 4:
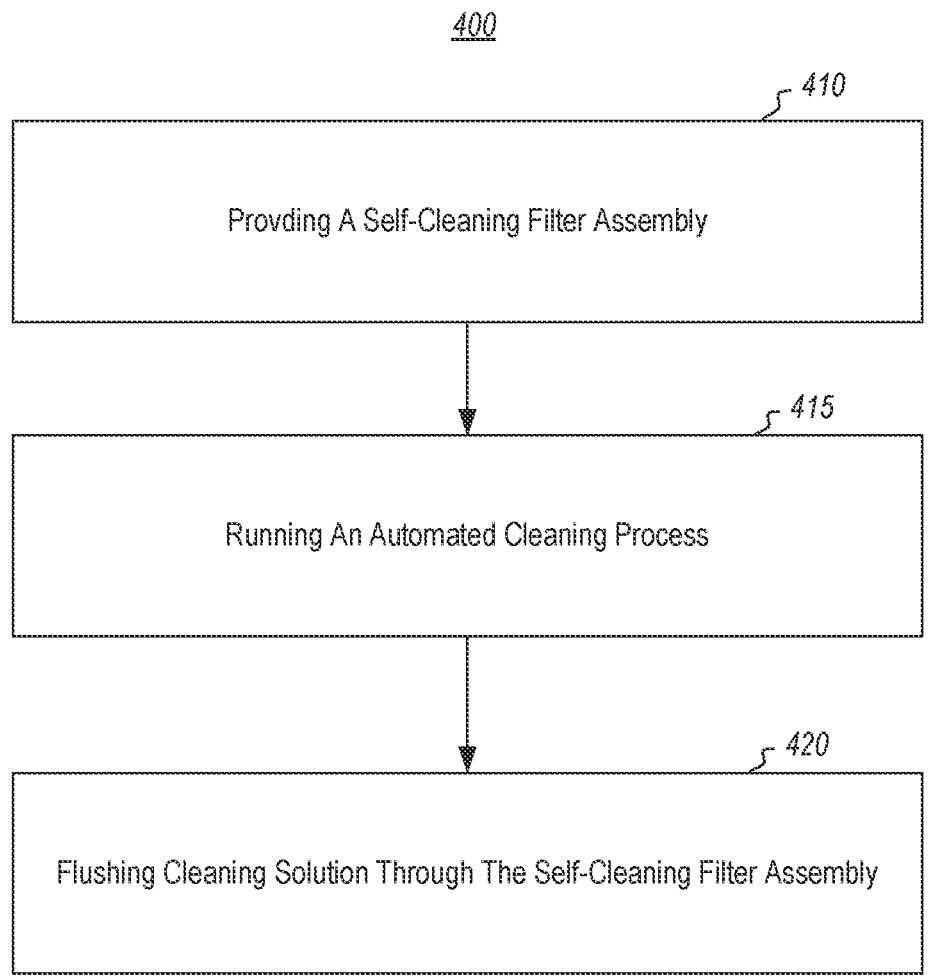
Figure 5:
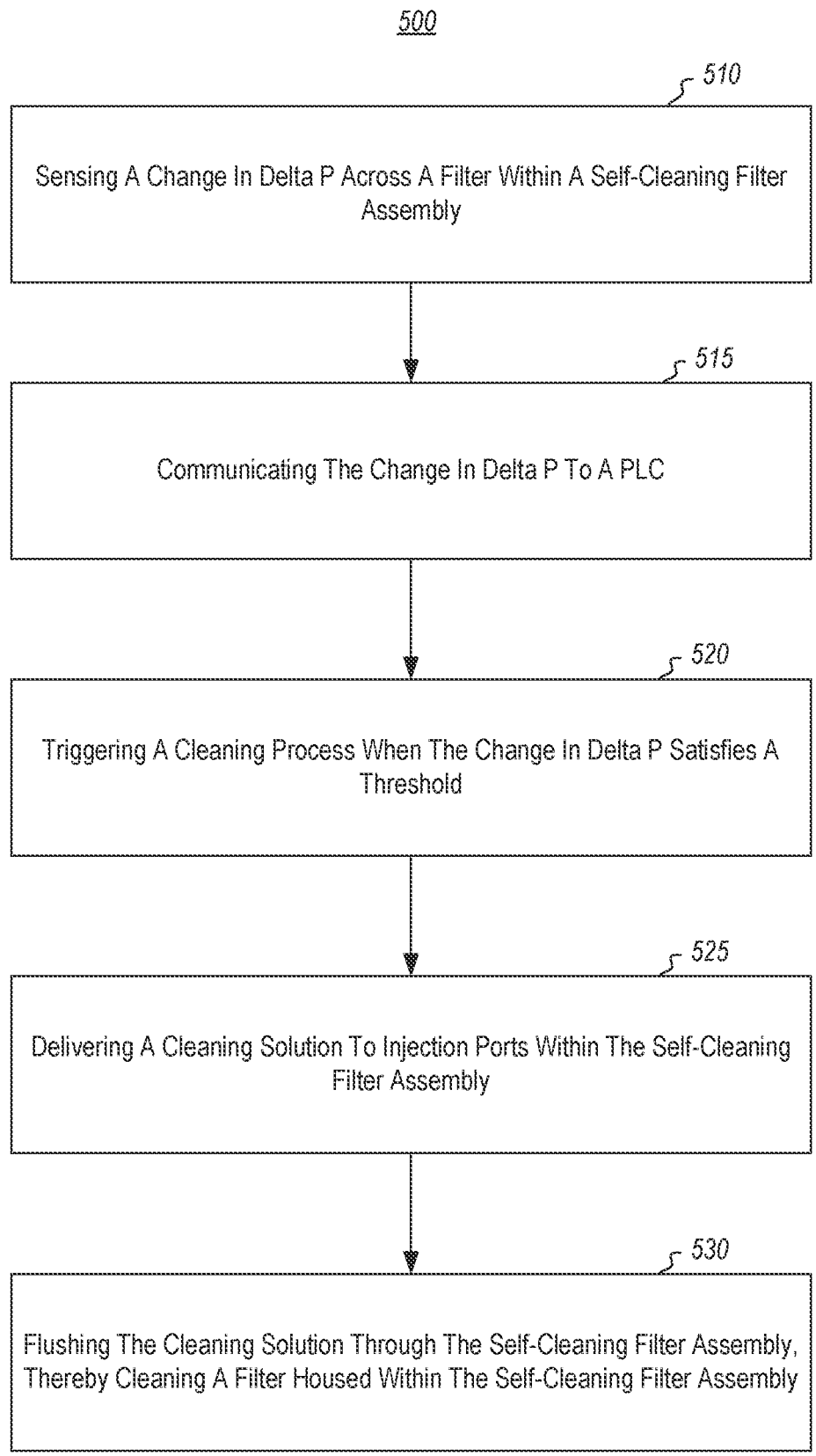

FIGS. 4 and 5 are flowcharts that illustrate example methods of cleaning HVAC filters and/or filter walls. As shown in FIG. 4, method 400 includes providing a self-cleaning filter assembly, at step 410. The self-cleaning filter assembly can be any one of the self-cleaning assemblies described herein. The method 400 also includes running an automated cleaning process, at step 415. Running the automated cleaning process may include, for example, mixing a cleaning solution and delivering the cleaning solution to the self-cleaning filter assembly. The method 400 further includes flushing cleaning solution through the self-cleaning filter assembly, at step 420. Flushing the cleaning solution through the self-cleaning filter assembly cleans the HVAC filter. Multiple self-cleaning filter assemblies can be arranged to form a filter wall. The method 400 can be implemented within each self-cleaning filter assembly forming the filter wall, thereby cleaning the filter wall.

As shown in FIG. 5, method 500 includes sensing a change in delta P across a filter within a self-cleaning filter assembly, at step 510. One or more sensors disposed with the self-cleaning filter assembly may be configured to sense, measure, and detect the change in delta P. The method 500 also includes communicating the change in delta P to a PLC, at step 515. The one or more sensors disposed within the self-cleaning filter assembly may communicate the detected change to the PLC. The PLC can be the PLC 210, described herein. The method 500 further includes triggering a cleaning process when the change in delta P satisfies a threshold level or value, at step 520. For example, the threshold value may be satisfied when the detected delta P is approximately 1-5% greater than the delta P the filter was designed to withstand.

The method 500 includes delivering a cleaning solution to injection ports within the self-cleaning filter assembly, at step 525. The self-cleaning filter assembly can include a plurality of injection ports disposed along top, bottom, and side edges of a casing of the self-cleaning filter assembly. The method 500 also includes flushing the cleaning solution through the self-cleaning filter assembly, thereby cleaning a filter housed within the self-cleaning filter assembly, at step 530. The cleaning solution may be drawn through the self-cleaning filter assembly by an air compressor or fan.

In some embodiments, the disclosed methods can additionally include flushing water or another aqueous-based cleaning solution through the self-cleaning filter assembly after the cleaning solution has been flushed through the self-cleaning filter assembly. Flushing water or another aqueous-based cleaning solution through the self-cleaning filter assembly assists in removing any particulates and/or cleaning solution clinging to the fibers of the filter. In some embodiments, the disclosed methods may be computer-implemented methods controlled by a programmable logic controller (PLC), such as PLC 210.

Additional Terms & Definitions

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. An automated cleaning system for cleaning a filter of a heating, ventilation, and air-conditioning (HVAC) system, the automated cleaning system comprising:
   a self-cleaning filter assembly comprising:
      a casing having a plurality of injection ports positioned along a top edge and a bottom edge of the casing, wherein the injection ports are configured to deliver a cleaning solution to a face of the filter; and
      a filter housed within the casing and positioned behind the plurality of injection ports such that the face of the filter is behind the plurality of injection ports;
   a central system comprising a controller, an air handler, and a reservoir tank; and
   at least one tube connecting the self-cleaning filter assembly to the reservoir tank of the central system.

2. The automated cleaning system of claim 1, further comprising a fan housed within the casing and disposed in front of the filter.

3. The automated cleaning system of claim 1, further comprising a heat transfer coil housed within the casing.

4. The automated cleaning system of claim 1, further comprising a plurality of sensors mounted within the casing.

5. The automated cleaning system of claim 4, wherein at least one of the plurality of sensors is a pressure sensor.

6. The automated cleaning system of claim 5, wherein the pressure sensor is configured to sense an air pressure or air flow across the filter.

7. The automated cleaning system of claim 5, wherein the pressure sensor is configured to communicate an air pressure or air flow across the filter to a central controller.

8. The automated cleaning system of claim 5, wherein the pressure sensor is configured to trigger a cleaning process when air pressure across the filter satisfies a threshold value.

9. The automated cleaning system of claim 8, wherein the threshold value comprises an approximately 1-5% change in air pressure across the filter compared to an air pressure the filter was designed to withstand.

10. The automated cleaning system of claim 1, further comprising one or more nozzles for emitting aerosolized enzymes into an air stream on a downstream side of the filter wall for application to heat transfer coils of the HVAC system.

11. An automated cleaning system for cleaning HVAC filters of an HVAC system, the automated cleaning system comprising:

a self-cleaning filter assembly;

a central system comprising a controller, an air handler, and a reservoir tank; and at least one tube connecting the self-cleaning filter assembly to the reservoir tank of the central system.

12. The automated cleaning system for cleaning HVAC filters of claim 11, wherein the self-cleaning filter assembly comprises:

a casing having a plurality of injection ports, at least one positioned along a top edge and at least one along a bottom edge of the casing, wherein the injection ports are configured to receive a cleaning solution from the reservoir tank; and a filter housed within the casing and positioned behind the injection ports such that a face of the filter is behind the injection ports and receives the cleaning solution from the injection ports.

13. The automated cleaning system of claim 11, wherein the reservoir tank is connected to a water line.

14. The automated cleaning system of claim 11, wherein the reservoir tank is configured to receive condensed water from cooling coils of the HVAC system.

15. The automated cleaning system of claim 11, wherein the automated system includes a plurality of self-cleaning filter assemblies (i) arranged as a filter wall and (ii) arranged with a tight tolerance such that no gaps are left between each of the plurality of self-cleaning filter assemblies, such that the system eliminates filter bypass.

16. The automated cleaning system of claim 11, further comprising one or more nozzles that emit aerosolized enzymes into an air stream on a downstream side of the filter for application to heat transfer coils of the HVAC system.

17. A method of automatically cleaning an HVAC filter of an HVAC system, the method comprising:

providing the automated cleaning system of claim 1; and flushing a cleaning solution through the self-cleaning filter assembly, whereby flushing the cleaning solution through the self-cleaning filter assembly automatically cleans the HVAC filter of the HVAC system.

18. The method of claim 17, further comprising:

providing a water line as a source of water for making the cleaning solution;

mixing water with one or more reagents to form the cleaning solution; and delivering the cleaning solution to injection ports.

19. The method of claim 17, further comprising:

collecting condensate water from the evaporative coil(s) of the HVAC system; and using the condensate water as an auxiliary or alternate source of water for making the cleaning solution.

20. The method of claim 17, further comprising emitting aerosolized enzymes into an air stream on a downstream side of the filter and applying the enzymes to heat transfer coils of the HVAC system.

* * * * *